July 5, 1960  T. HARRIS  2,943,758
CONTAINERS
Filed Aug. 19, 1958  3 Sheets-Sheet 1

INVENTOR.
THOMAS HARRIS
BY Ely, Pearne & Gordon
ATTORNEYS

July 5, 1960

T. HARRIS 2,943,758

CONTAINERS

Filed Aug. 19, 1958

INVENTOR.
THOMAS HARRIS
BY Ely, Pearne & Gordon
ATTORNEYS

United States Patent Office 2,943,758
Patented July 5, 1960

2,943,758

CONTAINERS

Thomas Harris, Gates Mills, Ohio, assignor to Structural Fibers, Inc., Chardon, Ohio, a corporation of Ohio Filed Aug. 19, 1958, Ser. No. 755,928

9 Claims. (Cl. 220—4)

This invention relates to containers having the general configuration of a polyhedron, and more particularly to relatively thin walled boxes or cases of light weight but great strength and rigidity for the strength and rigidity of the sheet material of which they are constructed. Such containers are particularly needed for the shipping and subsequent handling of fragile materials, such as medical supplies, for example, where the shipping containers are also used as storage containers for the original contents and for replacement supplies.

The objects of the invention are to provide thin walled, lightweight containers of the greatest possible strength and rigidity; to provide such containers in a form which is substantially free of lateral projections outwardly beyond planes defined by edges of the containers at which top, bottom, and side walls intersect; to provide such containers with a multiplicity of surface recesses in which handles and closure latches may be mounted entirely within the confines of the aforesaid planes; and to provide containers having the foregoing structural attributes which can be efficiently constructed of molded, rigid, sheet material, such as resin impregnated glass fiber mats and the like, without the use of expensive deep draw molds or sectional molds.

Containers of generally similar external configuration to the illustrative embodiment hereinafter described have heretofore been made of lightweight sheet metal, such as aluminum, but the softness of this material is such that the containers are too easily dented or otherwise deformed when subjected to heavy loads or rough handling. Attempts to form similarly shaped containers from harder and more rigid molding materials, such as resin impregnated glass fibers, have encountered serious manufacturing and cost problems. Molding such containers in a single unitary piece (except for a top closure) requires expensive, complex, sectional molds in order that the containers may be removed from the molds at the end of the molding process. This is due to the fact that suitable, thin walled containers having the required structural strength and provision for recessed handles and latches have had to be provided with interior surface irregularities which would prevent the withdrawal of simple one piece mold cores.

In accordance with the present invention, the foregoing objectives are achieved and the foregoing problems are overcome by constructing the containers from a plurality of separately molded panels, the panels being so designed that they may be efficiently and economically molded and then assembled to produce containers having the desired strength and rigidity, as well as thin walls providing maximum internal volume and minimum weight. The containers of the invention are characterized by panel shapes that interfit in overlapped relationship to provide multiple ply edges and corners of great strength, the panels being cemented together in the regions in which they overlap one another.

The foregoing and various other objects, features, and advantages of the invention will be more fully understood from the following description of an illustrative embodiment thereof and from the accompanying drawings referred to therein. In the drawings—

Figure 1:
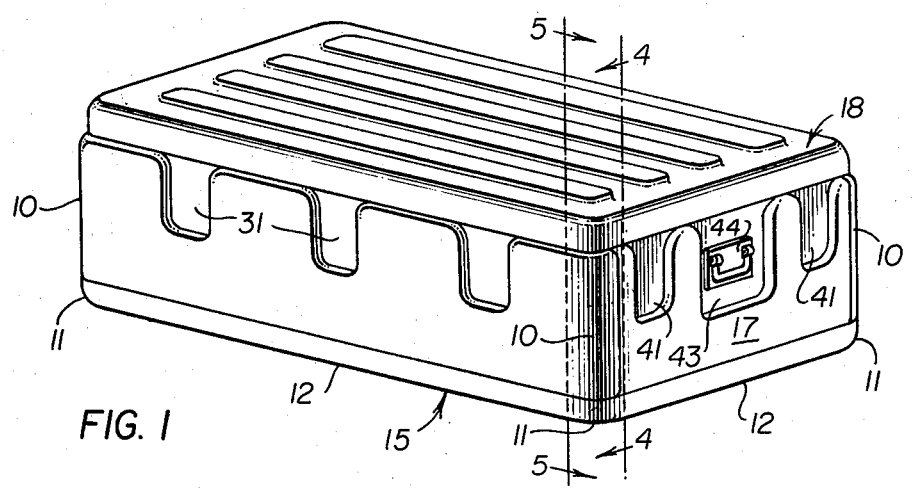
Fig. 1 is an isometric view of a container made in accordance with the invention.
Figure 3:
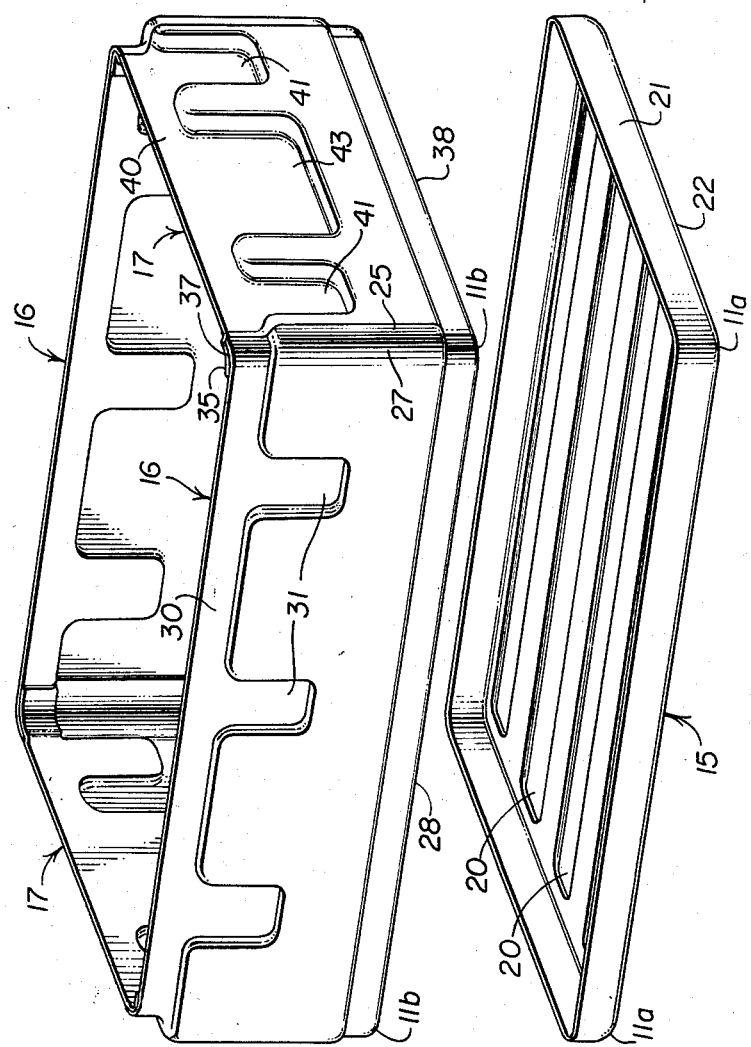
Figure 4:
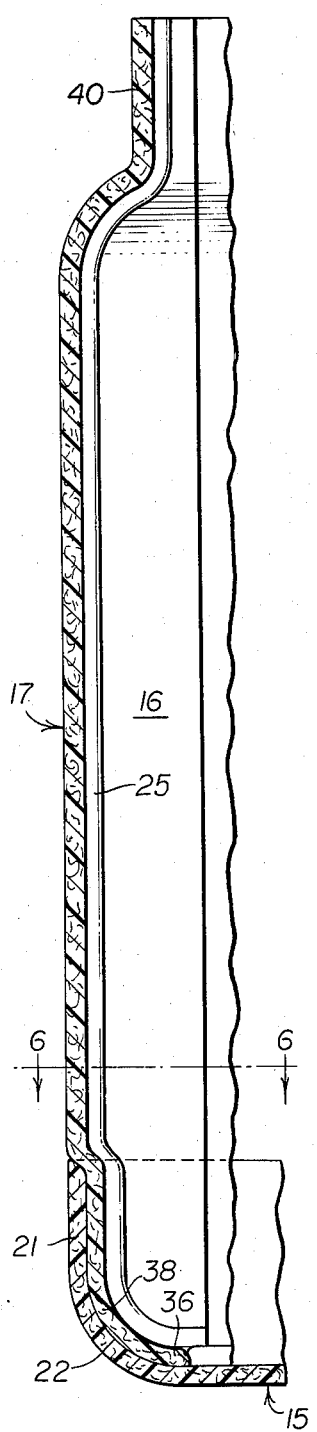
Figure 5:
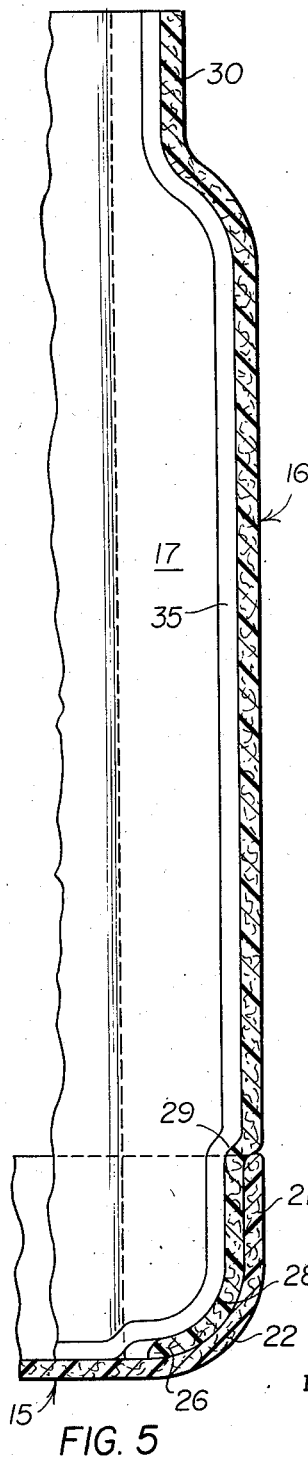
Figure 7:
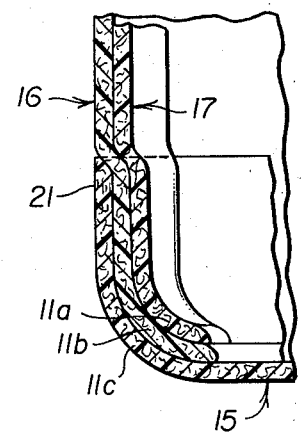
Figure 6:
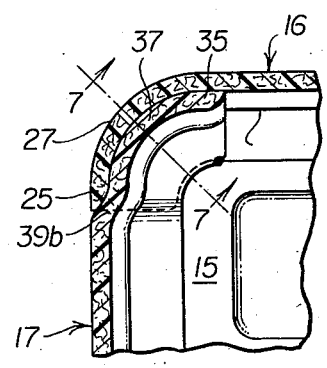

Fig. 3 is an isometric exploded view of the container of Fig. 1 in which the four side wall panels are shown assembled in their interfitting overlapped relationship as a subassembly in position to be lowered into interfitting overlapped relationship with the bottom panel; and Figs. 4, 5, 6, and 7 are fragmentary sectional views of the container of Fig. 1 (minus the top closure), Figs. 4 and 5 being respectively taken as indicated by the lines 4—4 and 5—5 in Fig. 1, Fig. 6 being taken as indicated by the line 6—6 in Fig. 4, and Fig. 7 being taken as indicated by the line 7—7 in Fig. 6.

The illustrated embodiment of the invention has the general form of a rectangular parallelopiped, i.e., all walls are generally rectangular and are disposed at right angles to each other. However, it is to be noted at the beginning that the invention is not limited to the six-sided container shape illustrated, but is equally applicable to containers having three, five, or more vertically disposed side walls similarly joined one to another and to the periphery of a horizontal bottom wall of appropriately conforming configuration, and adapted to receive a top closure of similarly conforming configuration.

For greater clarity of description and definition of the invention, certain terms used herein, and which are equally applicable to the illustrated embodiment and to the contemplated variants thereof, will first be defined with reference to the assembled container shown in Fig. 1. The normally vertically extending junctures 10 of adjoining side walls of the container are referred to as "corner edges" of the container. The lower ends of these junctures of the side walls where they join the bottom wall, designated 11 in the drawings, are referred to as "bottom corners" of the container. The normally horizontally extending junctures 12 of the several side walls with the bottom wall of the container are referred to as "bottom edges" of the container.

Figure 2:
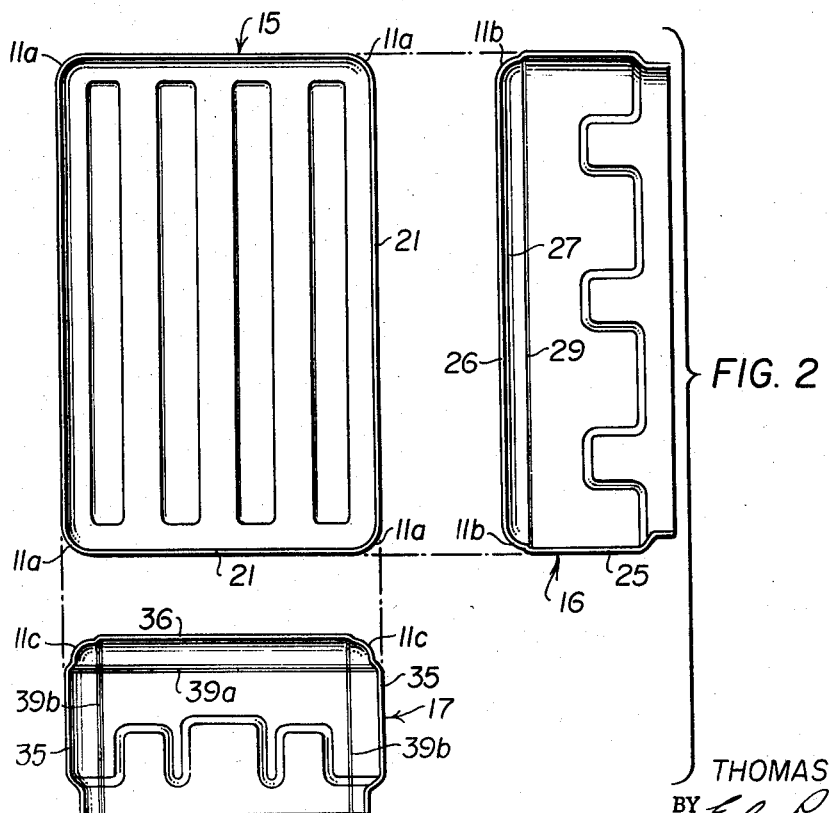
Fig. 2 is a fragmentary exploded view of the container of Fig. 1 (minus its top closure) showing a bottom panel and two side wall panels (each in plan) which are adapted to be assembled with two additional side wall panels to form the bottom and side walls of the assembled container.

Referring next to Figs. 2 and 3, the container itself comprises a bottom panel 15, a pair of opposed side wall panels 16, and another pair of opposed side wall panels 17, which latter may or may not be of substantially the same overall dimensions as the first pair of side wall panels 16. In any event, the panels 16 may be identical so they can be formed with the same dies or molds, and the panels 17 may be identical, with the same resultant advantage.

The bottom panel 15, side wall panels 16 and 17, and top closure 18 are all separately preformed, the bottom panel and several side panels being assembled so as to overlap one another, as hereinafter described, and being held together in the assembly by a suitable cement so as to form a rigid, open top container adapted to receive the top closure 18 as shown in Fig. 1. Each of these panels is preferably composed of a relatively thin, compressed sheet of loosely matted glass or other fibers, impregnated and coated with a thermosetting resin or the like, which is then set to a hard, infusible condition by procedures well known in the art. The thickness of the panels, when molded of such materials, may suitably be of the order of ⅛ inch for panels of the order of 2 to 3 feet in their maximum dimension. Obviously, however, the advantages of the particular panel shapes and of the container structure assembled from the several panels are not limited to the use of such materials of construction or to dimensional relationships of the order mentioned. In particular, the dimensional relationships should be varied to suit the strength and rigidity of any particular material of construction which may be employed.

The bottom panel 15 may suitably comprise a generally rectangular body portion having a plurality of parallel, longitudinally extending ribs or rib-like depressions 20 formed therein to stiffen and strengthen the panel. Four such ribs are shown in the illustrated embodiment of the invention. About its entire periphery, this panel is provided with an upwardly directed, continuous flange 21 integrally joined to the body portion of the panel by fillet portions 22 (Figs. 4 and 5) of substantially greater radius than the thickness of the material constituting the panel. As viewed in plan in Fig. 2, this panel and its peripheral flange are rounded at the four corners 11a to provide corner fillets also having radii substantially greater than the thickness of the material of construction.

The opposed side wall panels 16 also comprise generally rectangular body portions. Each of these side wall body portions is provided with inwardly turned side flanges 25 and a bottom flange 26 integrally joined to the body portion and to one another by fillet portions 27 and 28 (Figs. 5 and 6) of substantially greater radii than the thickness of the material of construction. The bottom marginal portion of each side panel 16 is inwardly offset along a line 29, relative to the body portion of the panel, by an amount substantially equal to the thickness of the material of construction for a purpose hereinafter described. This offset marginal portion includes at least the entire bottom flange 26 and its associated fillet portion 28 and extends around corners 11b where the flange 26 and fillet portion 28 merge with the flanges 25 and fillet portions 27. The upper marginal portion of each side wall panel 16 is also inwardly offset to provide a recessed marginal portion 30 adapted to be surrounded by the top closure member 18. The recessed marginal portion 30 may suitably include downwardly extending recessed areas 31 (three being shown) in which suitable toggle action latch fittings 32 or the like of any suitable type may be mounted for releasably securing the top closure 18 in place, without projecting outwardly beyond the outer surface of the body portions of the panels 16.

The opposed side wall panels 17 also comprise generally rectangular body portions, each being provided with inwardly turned side flanges 35 and a bottom flange 36 integrally joined to the body portion and to one another by fillet portions 37 and 38 (Figs. 4 and 6) of substantially greater radii than the thickness of the material of construction. The bottom and two side marginal portions of each side wall panel 17 are inwardly offset, along lines 39a and 39b, relative to the body portion of the panel, by an amount substantially equal to the thickness of the material of construction for a purpose hereinafter described. These offset portions include at least the entire side and bottom flanges 35 and 36 and their respectively associated fillet portions 37 and 38. However, on each of the side wall panels 17, lower corners 11c formed by the mergence of the flange 36 and fillet 38 with the flanges 35 and fillets 37 are still further inwardly offset by an additional amount substantially equal to the thickness of the material of construction, for a purpose hereinafter described. The upper marginal portion of each side wall panel 17 is also inwardly offset to provide a recessed marginal portion 40 adapted to be surrounded by the top closure member 18. The recessed marginal portion 40 may suitably include downwardly extending recessed areas 41 (two being shown) in which additional fittings 32 may be seated for the purpose mentioned above. Also, another centrally disposed downwardly extending recessed area 43 may also be provided in which a pivotal handle fitting 44 of any desired type may be mounted for use in lifting the container, while normally being retracted inwardly of the outer surface of the body portions of the panels 17.

The toggle latch fittings 32 and the handle fittings 44 on the container may be mounted on the several side wall panels at any desired time after fabrication of these panels. Generally, it will be found most convenient to mount them before the side wall panels are assembled with each other to produce the subassembly shown in Fig. 2 and described hereinafter.

The top closure panel 18 will generally be quite similar to the bottom panel 15, but of slightly less length and width, and the fillet portions which join the downturned marginal portion to the body of the top panel may be of somewhat smaller radius than the corresponding radius for the bottom panel 15. In other respects, as is apparent from a comparison of Figs. 1 and 2, the top closure panel 18 may be identical with the bottom panel 15 and, therefore, requires no further description, except to note the suitable brackets are attached thereto as cooperating parts of the toggle action latch fittings 32 mounted on the several side wall panels 16 and 17.

In assembling the panels 15, 16, and 17 to form the container, various alternative procedures may be employed. Fig. 3 indicates one of these procedures in which the four side panels have been first interfitted one with another in overlapped relationship as a subassembly. In this subassembly, the inwardly offset, inturned side marginal portions of each side wall panel 17 are disposed inside of and are overlapped by the inturned side marginal portions of the adjoining side wall panels 16. By reason of the inward offsets along the lines 39b of the side wall panels 17, the overlapping inturned marginal portions of the side wall panels 16 merge into the planes of the bodies of the side wall panels 17, as most clearly shown in Fig. 6, and the side flanges 25 of the side wall panels 16 are thus brought into coplanar alignment with the body portions of the adjoining side wall panels 17. This produces a substantially flush exterior surface entirely about this side wall subassembly. By reason of the additional inward offset of the lower corners 11c of the side wall panels 17, described above, the corners 11b of the side wall panels 16 cover the corners 11c and merge into the inturned bottom marginal portions of the side wall panels 17 to provide the same flush exterior over these regions of the subassembly, as most clearly shown in Fig. 7.

The elements of the above described subassembly are permanently and strongly cemented together by a suitable cement squeezed, painted, or otherwise spread over the opposed overlapped surfaces of the several panels before they are assembled. Well known thermosetting epoxy resin cements are ideal for this purpose when the panels are made of matted fibers impregnated and coated with conventional polyester resins. These cements are capable of providing joints substantially as strong as the impregnated panels adjacent the joints. After application of the cement and assembly of the side wall panels as shown, the joints between panels in this subassembly are clamped together by any suitable clamps and subjected to heat to set the cement, as by passing the clamped subassembly through an oven.

When the above described subassembly is complete, the clamps thereon are removed. The inwardly offset, exteriorly flush bottom edge of the subassembly is nestled within the upturned marginal portion of the bottom panel 15 in overlapping relationship therewith, after first applying cement to the opposed overlapping surfaces. Suitable clamps are then applied to the additional cemented joints thus formed, and heat is similarly applied to set the newly applied cement. This completes the assembly, and the container is ready to receive the separately formed, removable, top closure member 18.

By reason of the inward offsets along the lines 29 and 39a on the side wall panels 16 and 17, and by reason of the flush exterior of the inwardly offset bottom margin of the subassembly entirely about its periphery, including the four corners thereof, the overlapping upturned marginal portion of the bottom panel 15 merges into the planes of the bodies of the side wall panels 16 and 17 above and along the bottom edges 12 of the container, as most clearly shown in Figs. 4 and 5, and merges into the corner edges 10 of the container, which are defined by the inturned side marginal portions of the side wall panels 16, as most clearly shown in Fig. 7. This produces a substantially flush exterior surface entirely about and beyond the bottom edges 12, bottom corners 11, and corner edges 10 of the finished container.

The construction disclosed herein provides multiple plies of material strategically located along portions of the container so as to greatly add to its strength and rigidity. At the same time, it maintains the desired, substantially flush, exterior surfaces over all of the regions where one panel overlaps another. As is best shown in Figs. 4-7, two plies of sheet material are provided along the vertical corner edges 10 and the horizontal corner edges 12, and three plies are provided over each of the bottom corners 11.

It will also be appreciated that the various offsets provided in the side wall panels, including those along the joints between panels and those which define the large recesses 31, 41, and 43, function as stiffeners and strengtheners of the container structure.

As hereinbefore noted, one of the principal advantages of the invention is the ease with which the various separately formed panels 15, 16, 17, and 18 may be fabricated using simple, inexpensive, one piece, top and bottom mold sections. Using conventional techniques, each such panel may be made by laying a mat of loosely matted fibers on a bottom mold section. After pouring a measured amount of a thermosettable liquid resin onto the mat, a top mold section is lowered with pressure to compress and conform the matting to the desired shape while expressing the resin into impregnating and coating relationship therewith. After heat curing the resin, the mold sections may be freely separated and the finished molded panel freely removed.

It is virtually impossible to produce a deep box of the configuration shown herein in a single molding operation, using presently known molding techniques, without drawing out the matting at the edges and corners to inadequate thicknesses as pressure is applied in the final closing of the mold with the pressure necessary to produce the fiber compaction for high strength. Such drawing out of the matting at the edges and corners leaves these regions deficient in fiber content, and weak corner and edge structures result. However, when molding the shallow individual panels of which the containers of the present invention are assembled, the above effects are encountered only to a negligible degree, and sound, strong, peripheral flanges result. When a plurality of these sound, strong flanges are overlapped to produce double thickness edges and triple thickness corners, the resulting assembly is far stronger than a one piece molded container having corresponding dimensions and the wall thicknesses at all points as the multiple piece container. Thus, the invention not only facilitates the manufacture of the container and produces one having optimum dimensions for achieving the desired strength, but it produces a far stronger product than could be produced by unitary molding of a container of identical dimensions by known, practical, molding techniques.

As will be apparent from the foregoing, various details of the invention as disclosed herein may be modified without departing from the scope of the appended claims.

Having defined my invention, I claim:

1. A container comprising an assembly of a generally rectangular bottom panel and four generally rectangular, adjoining side wall panels, said bottom panel including an upwardly directed continuous, peripheral flange integrally joined thereto by a fillet portion of substantial radius, and each of said side wall panels including inwardly turned side and bottom flanges integrally joined thereto and one to another by fillet portions of substantial radius, each side wall panel having its end portions in the region of the associated flanges and fillets disposed in overlapped relationship with the adjacent corresponding end portions of adjoining side wall panels to provide two ply vertical corner edges of the container, one of said plies along each such corner edge being offset relative to its panel to dispose its panel in coplanar alignment with the flange part of the other ply along that corner edge, each side wall panel having its bottom edge in the region of its associated flange and fillet portion disposed in overlapped relationship with the bottom panel in the region of its flange and fillet portion to provide two ply horizontal bottom edges of the container, one of said plies along each such bottom edge being offset relative to its panel to dispose its panel in coplanar alignment with the flange part of the other ply along that bottom edge, and the two ply overlapped junction of each pair of adjoining side wall panels extending into overlapped relationship with the flange and fillet portion of the bottom panel to provide three ply bottom corners of the container.

2. A container according to claim 1 in which the two side wall plies at each three ply bottom corner of the container are offset relative to their respective panels to dispose the flange portion of the bottom panel ply in vertical alignment with each side wall panel.

3. A container according to claim 1 in which the inner ply along each two ply corner edge of the container is inwardly offset relative to its panel to dispose its panel in coplanar alignment with the outer ply along that corner edge.

4. A container according to claim 1 in which the inner ply along each two ply corner edge of the container is inwardly offset relative to its panel to dispose its panel in coplanar alignment with the outer ply along that corner edge, and the two side wall plies at each three ply bottom corner of the container are inwardly offset relative to their respective panels to dispose the flange portion of the bottom panel ply in vertical alignment with each side wall panel.

5. A container comprising an assembly of a bottom panel and generally rectangular side wall panels joined one to another and to the bottom panel entirely about its periphery, said bottom panel including an upwardly directed, continuous, peripheral flange integrally joined thereto by a fillet portion of substantial radius, and each of said side wall panels including inwardly turned side and bottom flanges integrally joined thereto and one to another by fillet portions of substantial radius, said side wall panels being overlapped one with another to provide two ply vertical corner edges of the container and being overlapped with the bottom panel to provide two ply horizontal bottom edges of the container, and the two ply overlapped junction of each pair of adjoining side walls extending into overlapped relationship with the flange and fillet portion of the bottom panel to provide three ply bottom corners of the container, one of each pair of overlapped plies along each corner edge and bottom edge of the container being offset relative to its panel to dispose its panel in coplanar alignment with the flange part of the other ply of that edge of the container.

6. A container according to claim 5 in which the two side wall plies at each three ply bottom corner of the container are offset relative to their respective panels to dispose the flange portion of the bottom panel ply in vertical alignment with each side wall panel.

7. A container according to claim 5 in which the inner ply along each two ply corner edge of the container is inwardly offset relative to its panel to dispose its panel in coplanar alignment with the outer ply along that corner edge.

8. A container according to claim 5 in which the inner ply along each two ply corner edge of the container is inwardly offset relative to its panel to dispose its panel in coplanar alignment with the outer ply along that corner edge, and the two side wall plies at each three ply bottom corner of the container are inwardly offset relative to their respective panels to dispose the flange portion of the bottom panel ply in vertical alignment with each side wall panel.

9. A container comprising an assembly of a bottom panel and generally rectangular side wall panels joined one to another and to the bottom panel entirely about its periphery, said panels being relatively rigid sheets of matted glass fibers impregnated and coated with a thermoset resin and being cemented together along overlapped margins of the panels, said bottom panel including an upwardly directed, continuous, peripheral flange integrally joined thereto by a fillet portion of substantially greater radius than the thickness of the bottom panel, and each of said wall side panels including inwardly turned side and bottom flanges integrally joined thereto and end to end with one another by fillet portions of substantially greater radius than the thickness of the side wall panels, said side wall panels being overlapped one with another to provide two ply vertical corner edges of the container and being overlapped with the bottom panel to provide two ply horizontal bottom edges of the container, and the two ply overlapped junction of each pair of adjoining side walls extending inwardly into overlapped relationship with the flange and fillet portion of the bottom panel to provide three ply bottom corners of the container, one of each pair of overlapped plies along each corner edge and bottom edge of the container being inwardly offset relative to its panel to dispose its panel in coplanar alignment with the flange part of the other ply of that edge of the container, the flange and fillet portion of the bottom panel surrounding the bottom flanges and fillet portions of the side wall panels in overlapped relationship therewith, and the two ply junctures of the side wall panels being inwardly offset at the bottom corners of the container where they overlap the bottom panel to dispose the flange of the bottom panel in vertical alignment with each of the side wall panels, whereby the multiple ply junctures of the several panels along the corner edges and bottom edges and at the corners of the container are all flush with the adjacent panel portions exteriorly of the container.

References Cited in the file of this patent

UNITED STATES PATENTS

| | | |
|---|---|---|
| 1,912,915 | Piker | June 6, 1933 |
| 2,156,644 | Thomasen | May 2, 1939 |
| 2,252,779 | Moore | Aug. 19, 1941 |
| 2,596,043 | Piker | May 6, 1952 |
| 2,606,708 | Irvan | Aug. 19, 1952 |
| 2,751,109 | Moore | June 19, 1956 |